(12) United States Patent
Aoyagi

(10) Patent No.: US 9,814,979 B2
(45) Date of Patent: Nov. 14, 2017

(54) DATA PROVISION SYSTEM, PROVISION APPARATUS, EXECUTION APPARATUS, CONTROL METHOD, AND RECORDING MEDIUM

(71) Applicant: KABUSHIKI KAISHA SQUARE ENIX, Tokyo (JP)

(72) Inventor: Hidetoshi Aoyagi, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 382 days.

(21) Appl. No.: 14/594,595

(22) Filed: Jan. 12, 2015

(65) Prior Publication Data

US 2015/0126277 A1    May 7, 2015

Related U.S. Application Data

(63) Continuation of application No. PCT/JP2012/004868, filed on Jul. 31, 2012.

(51) Int. Cl.
*A63F 13/52*    (2014.01)
*A63F 13/355*    (2014.01)
(Continued)

(52) U.S. Cl.
CPC .............. *A63F 13/52* (2014.09); *A63F 13/34* (2014.09); *A63F 13/355* (2014.09); *A63F 13/30* (2014.09); *A63F 13/35* (2014.09)

(58) Field of Classification Search
CPC .......... A63F 13/30; A63F 13/34; A63F 13/35; A63F 13/52
See application file for complete search history.

(56) References Cited

U.S. PATENT DOCUMENTS 8,041,374 B2    10/2011    Miwa et al.
2004/0205589 A1    10/2004    Yoshioka
(Continued)

FOREIGN PATENT DOCUMENTS

JP    2001-134776    5/2001
JP    2001-209571    8/2001
(Continued)

OTHER PUBLICATIONS

Office Action from Japan Patent Office (JPO) in Japanese Patent Appl. No. 2014-129700, dated Feb. 5, 2016, together with an English language translation.
(Continued)

*Primary Examiner* — Damon Pierce
(74) *Attorney, Agent, or Firm* — Greenblum & Bernstein, P.L.C.

(57) ABSTRACT

A provision apparatus provides data for a game content to an execution apparatus which generates a game screen for the game content by executing rendering processing for the game content. The apparatus receives, from the execution apparatus, a provision request of a first data, which at least includes a minimum required data on the execution start timing of the rendering processing for the game content, among the data for the game content, and a provision request of a second data among the data for the game content other than the first data, and transmits corresponding data to the execution apparatus. The apparatus receives the provision request of the second data from the execution apparatus after completing the transmission of the first data.

12 Claims, 4 Drawing Sheets

(51) Int. Cl.
*A63F 13/34* (2014.01)
*A63F 13/30* (2014.01)
*A63F 13/35* (2014.01)

(56) References Cited

U.S. PATENT DOCUMENTS

2006/0068702 A1  3/2006  Miwa et al.
2012/0004042 A1*  1/2012  Perry .................. A63F 13/30
                                                         463/42

FOREIGN PATENT DOCUMENTS

| | | |
|---|---|---|
| JP | 2002-197016 | 7/2002 |
| JP | 2002-351778 | 12/2002 |
| JP | 2003-162475 | 6/2003 |
| JP | 2003-198614 | 7/2003 |
| JP | 2004-502236 | 1/2004 |
| JP | 3761091 | 1/2006 |
| JP | 2006-178782 | 7/2006 |
| JP | 2008-234206 | 10/2008 |
| JP | 2009-009297 | 1/2009 |
| JP | 2010-240210 | 10/2010 |
| JP | 2011-160836 | 8/2011 |
| JP | 2013-126496 | 6/2013 |
| WO | 02/01350 | 1/2002 |

OTHER PUBLICATIONS

Office Action from Japan Patent Office (JPO) in Japanese Patent Appl. No. 2014-129700, dated Jun. 22, 2015, along with a partial English language translation thereof.

International Search Report (ISR) in International Patent Applicaton No. PCT/JP2012/004868, dated Oct. 30, 2012.

Office Action from Japan Patent Office (JPO) in Japan Patent Application No. 2013-550067, dated Apr. 25, 2014, together with an english language translation.

* cited by examiner

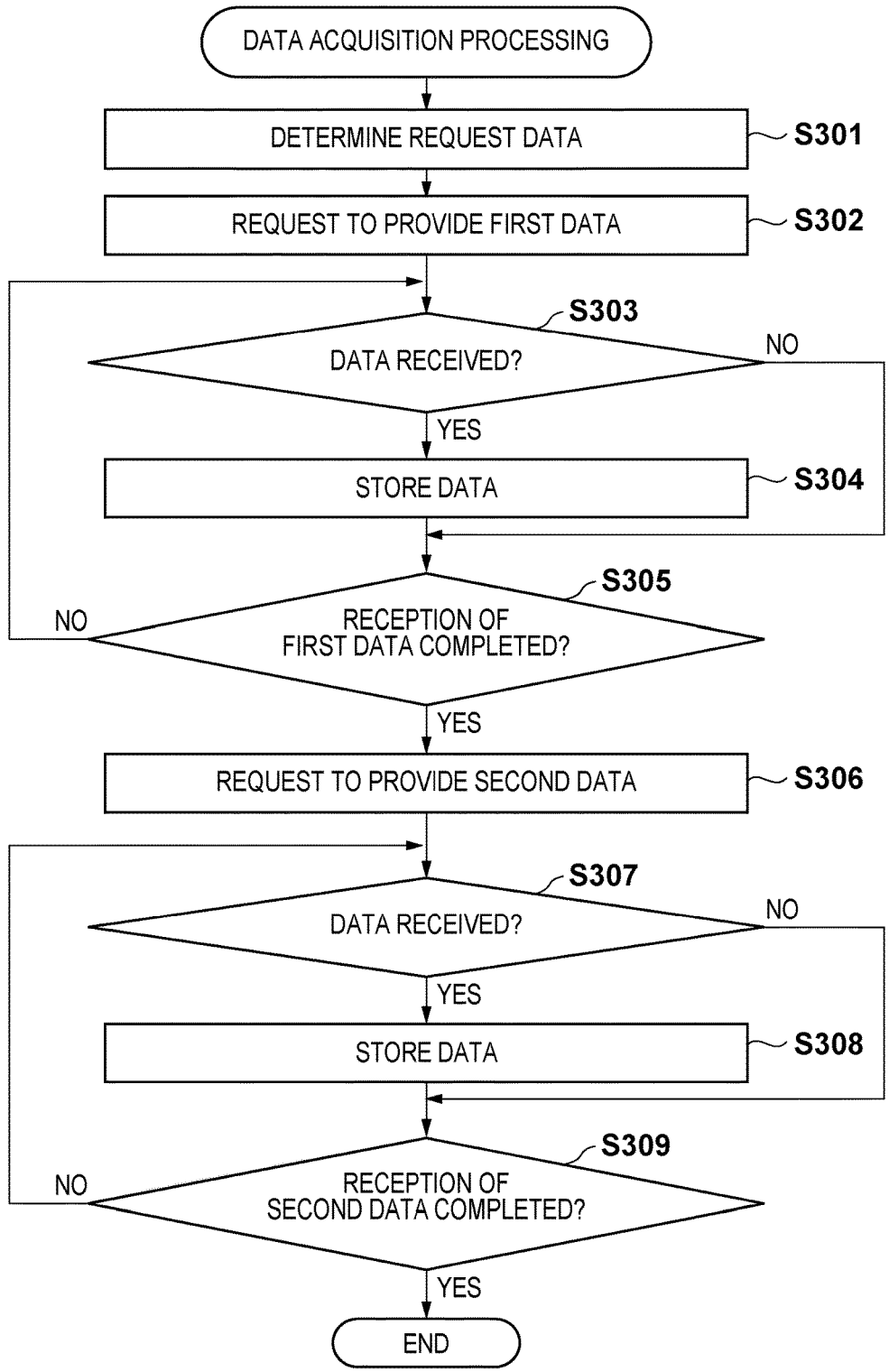

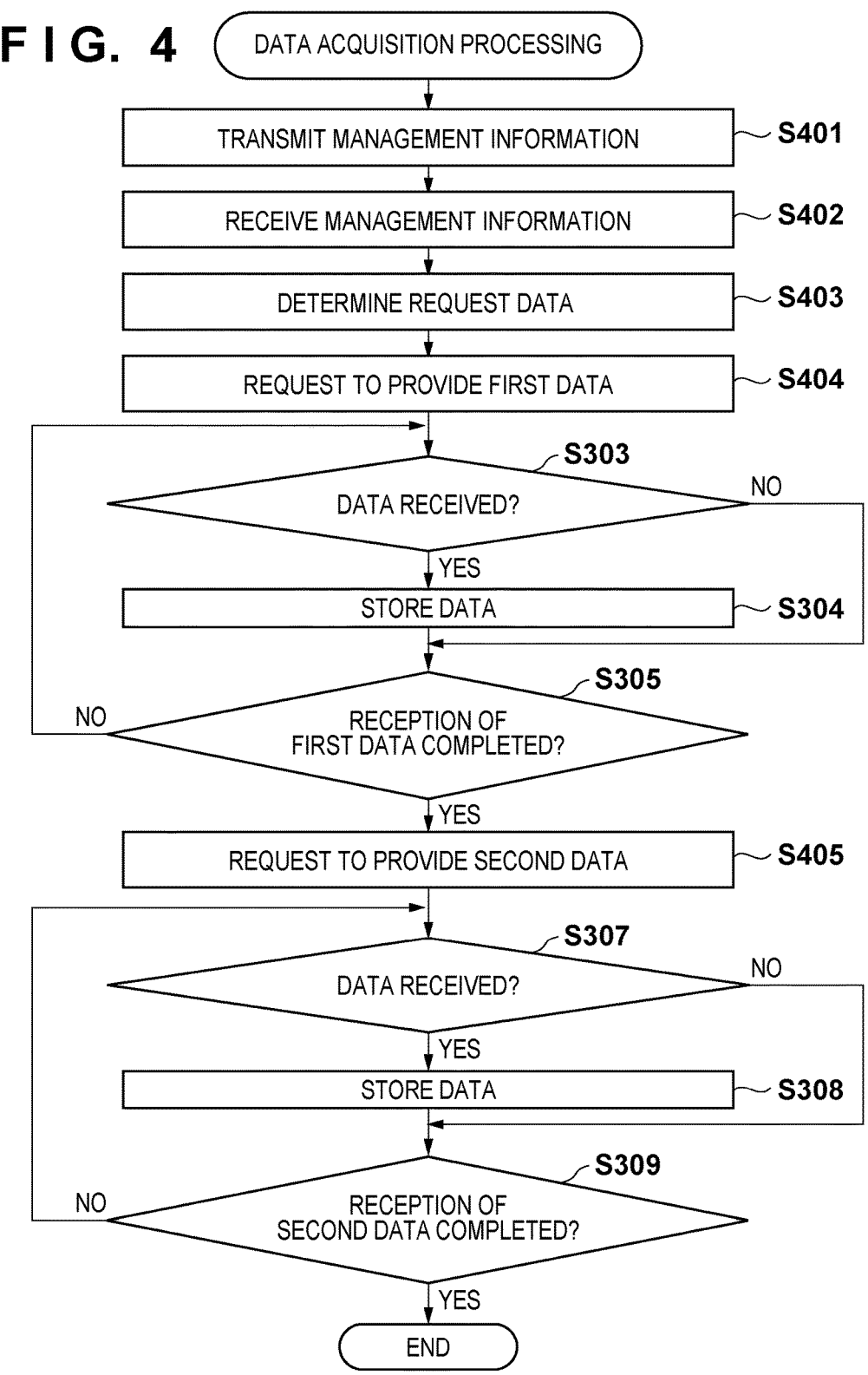

DATA PROVISION SYSTEM, PROVISION APPARATUS, EXECUTION APPARATUS, CONTROL METHOD, AND RECORDING MEDIUM

This application is a continuation of International Application No. PCT/JP2012/004868 filed on Jul. 31, 2012, the entire content of which is incorporated herein by reference.

BACKGROUND OF THE INVENTION

Field of the Invention

The present invention relates to a data provision system, a provision apparatus, an execution apparatus, a control method, and a recording medium, and in particular to a technique of data communication between devices for content provision.

Description of the Related Art

By using a terminal such as a personal computer (PC), a mobile telephone, a smartphone, a home-use game console, or a portable game device, a user can use various content. Providing content to the user is realized by the content being stored in the terminal to be used, for example by the user executing an application or the like that was installed in advance as a package in the terminal. Furthermore, in recent years, a method is also used in which data on content is temporarily acquired from an external device via communication at the time of use of the content without being installed, and is provided to a user.

For example, in a so-called online game service, in which a game content is provided via a network, a terminal connects to a service providing server to receive data on the game content, and then a user can execute the game on the terminal. Furthermore, Japanese Patent No. 3761091 discloses a technique for downloading a game program from another game device, executing the downloaded game program after completion of the downloading, and providing a game content to a user.

However, in a service that needs to receive data on content at the time of use of the service, such as the above-described online game service, since the content is not provided until the reception of the data is completed, a user needs to wait for the start of the provision in the data receiving state. Particularly, in recent years, an amount of data that can be dealt with in a terminal has increased along with an improvement in throughput of the terminal alone, and thus the total amount of content data as well is on the increase. That is, it may be inevitable that the waiting time of the user is prolonged if no improvement in the speed of data communication is achieved, resulting in the situation that such a prolonged waiting time may lose the interest of the user.

SUMMARY OF THE INVENTION

The present invention was made in view of the above-described problem, and it is an object of the present invention to provide a data provision system, a provision apparatus, an execution apparatus, a control method, and a recording medium that improve usability in providing content via communication.

In order to achieve the above-described object, the present invention includes the following configurations.

A present invention in its first aspect provides a data provision system including a provision apparatus which provides data for a game content and an execution apparatus which receives the data from the provision apparatus and generates a game screen for the game content by executing rendering processing for the game content, wherein the execution apparatus comprising: a request transmitter which is able to transmit, to the provision apparatus, a provision request of a first data, which at least includes a minimum required data on the execution start timing of the rendering processing for the game content, among the data for the game content, and a provision request of a second data among the data for the game content other than the first data; a receiver which is able to receive the first data and the second data from the provision apparatus; and a generator which is able to generate a game screen for the game content by using the data received by the receiver, wherein the provision apparatus comprising: a request receiver which is able to receive, from the execution apparatus, the provision request of the first data or the second data; a first transmitter which is able to transmit, to the execution apparatus, the first data depending on the reception of the provision request of the first data by the request receiver; and a second transmitter which is able to transmit, to the execution apparatus, the second data depending on the reception of the provision request of the second data by the request receiver, and wherein the generator starts the generation of a game screen for the game content by using the received first data after waiting the completion of the reception of the first data, and performs the generation of a game screen for the game content by using the first data and the second data after the reception of the second data.

A present invention in its second aspect provides a provision apparatus providing data for a game content to an execution apparatus which generates a game screen for the game content by executing rendering processing for the game content, comprising: a request receiver which is able to receive, from the execution apparatus, a provision request of a first data, which at least includes a minimum required data on the execution start timing of the rendering processing for the game content, among the data for the game content, and a provision request of a second data among the data for the game content other than the first data; a first transmitter which is able to transmit, to the execution apparatus, the first data depending on the reception of the provision request of the first data by the request receiver; and a second transmitter which is able to transmit, to the execution apparatus, the second data depending on the reception of the provision request of the second data by the request receiver, wherein the request receiver receives the provision request of the second data from the execution apparatus after completing the transmission of the first data.

A present invention in its third aspect provides an execution apparatus receiving, from a provision apparatus which provides data for a game content, the data and generating a game screen for the game content by executing rendering processing for the game content, comprising: a request transmitter which is able to transmit, to the provision apparatus, a provision request of a first data, which at least includes a minimum required data on the execution start timing of the rendering processing for the game content, among the data for the game content, and a provision request of a second data among the data for the game content other than the first data; a receiver which is able to receive the first data and the second data from the provision apparatus; and a generator which is able to generate a game screen for the game content by using the data received by the receiver, wherein the generator starts the generation of a game screen for the game content by using the received first data after waiting the completion of the reception of the first data, and performs the generation of a game screen for the game content by using the first data and the second data after the reception of the second data.

A present invention in its fourth aspect provides a control method of a data provision system including a provision apparatus which provides data for a game content and an execution apparatus which receives the data from the provision apparatus and generates a game screen for the game content by executing rendering processing for the game content, comprising: the execution apparatus transmits, to the provision apparatus, a provision request of a first data, which at least includes a minimum required data on the execution start timing of the rendering processing for the game content, among the data for the game content, and a provision request of a second data among the data for the game content other than the first data; the provision apparatus receives, from the execution apparatus, the provision request of the first data or the second data; the provision apparatus transmits, to the execution apparatus, the first data depending on the reception of the provision request of the first data; the provision apparatus transmits, to the execution apparatus, the second data depending on the reception of the provision request of the second data, the execution apparatus generates a game screen for the game content by using the received data, wherein the execution apparatus transmits the provision request of the second data after completing the reception of the first data, and the execution apparatus starts the generation of a game screen for the game content by using the received first data after waiting the completion of the reception of the first data, and performs the generation of a game screen for the game content by using the first data and the second data after the reception of the second data.

A present invention in its fifth aspect provides a control method of a provision apparatus providing data for a game content to an execution apparatus which generates a game screen for the game content by executing rendering processing for the game content, comprising: receiving, from the execution apparatus, a provision request of a first data, which at least includes a minimum required data on the execution start timing of the rendering processing for the game content, among the data for the game content, and a provision request of a second data among the data for the game content other than the first data; transmitting, to the execution apparatus, the first data depending on the reception of the provision request of the first data; and transmitting, to the execution apparatus, the second data depending on the reception of the provision request of the second data, wherein the provision request of the second data from the execution apparatus is received after completing the transmission of the first data.

A present invention in its sixth aspect provides a control method of an execution apparatus receiving, from a provision apparatus which provides data for a game content, the data and generating a game screen for the game content by executing rendering processing for the game content, comprising: transmitting, to the provision apparatus, a provision request of a first data, which at least includes a minimum required data on the execution start timing of the rendering processing for the game content, among the data for the game content, and a provision request of a second data among the data for the game content other than the first data; receiving the first data and the second data from the provision apparatus; and generating a game screen for the game content by using the received data, wherein after waiting the completion of the reception of the first data, the generation of a game screen for the game content is started by using the received first data, and after the reception of the second data, the generation of a game screen for the game content is performed by using the first data and the second data.

Further features and advantages of the present invention will become apparent from the following description with reference to the attached drawings. Note that in the attached drawings, the same reference numerals are given to the same or similar configuration.

BRIEF DESCRIPTION OF THE DRAWINGS

The attached drawings are included in the specification and constitute part thereof, showing embodiments of the present invention, and being used for illustrating the spirit of the present invention together with the description of the embodiments.

FIG. 3 is a flowchart showing an example of data acquisition processing that is executed in the client terminal 200, according to Embodiment 1 of the present invention.

FIG. 4 is a flowchart showing an example of data acquisition processing that is executed in the client terminal 200, according to Embodiment 2 of the present invention.

DESCRIPTION OF THE EMBODIMENTS

Embodiment 1

Hereinafter, exemplified embodiments of the present invention will be described in detail with reference to the drawings. Note that the below described embodiment will describe an example in which the present invention is applied to a content server that can distribute data on content to be managed, the content server serving as an example of a content provision device of a content provision system, and to a client terminal that can receive the data on the content from the content server to play back the content, the client terminal serving as a content playback device of the content provision system. However, the present invention is applicable to any device as long as it can distribute or receive data on content to play back the content.

Furthermore, the description is given assuming that in the content provision system of the present embodiment, content that is provided by a content server 100 is content of a so-called online game, which is executed via a network. In a client terminal 200, a basic program for executing the game is executed as an application, and a user can start connecting to the content server 100 by executing the application, and can use a game content service provided by the content server 100. By receiving data on the game content from the content server 100, the client terminal 200 can display a screen that is generated using the data on a below-described display unit 208 of the client terminal 200. Alternatively, the client terminal 200 can play back received sound data. However, content that is provided by the content server 100 is not limited to a game content, and may be any content as long as it is content whose data is received from the content server 100 by the client terminal 200 and that is played back by the client terminal 200.

Content Provision System Configuration

Figure 1A:
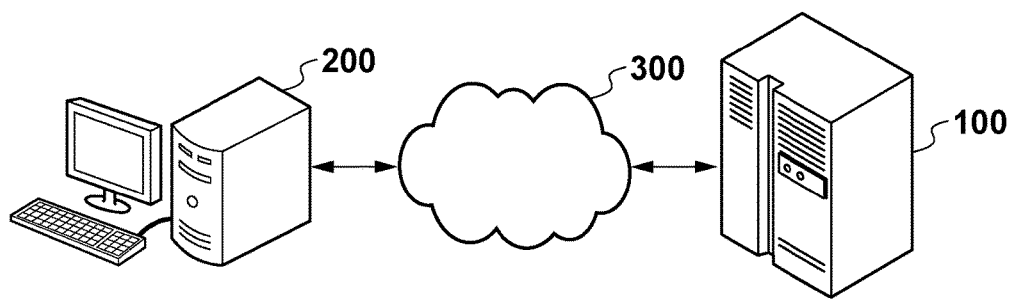
FIG. 1A is a diagram showing a system configuration of a content provision system according to Embodiment 1 of the present invention.

FIG. 1A is a diagram showing a system configuration of the content provision system according to the embodiment of the present invention.

As shown in the figure, in the content provision system of the present embodiment, the content server 100 and the client terminal 200 are connected to each other via a network 300, which is a public line such as the Internet. Note that in the present embodiment, the description is given assuming that the content server 100 and the client terminal 200 are connected to each other via the network 300 since content that is provided by the content server 100 is an online game content, but it will readily be appreciated that the both devices may also be connected directly to each other. Furthermore, the content server 100 and the client terminal 200 may, of course, be connected to each other via another relay device.

Functional Configuration of Content Server 100

Figure 2A:
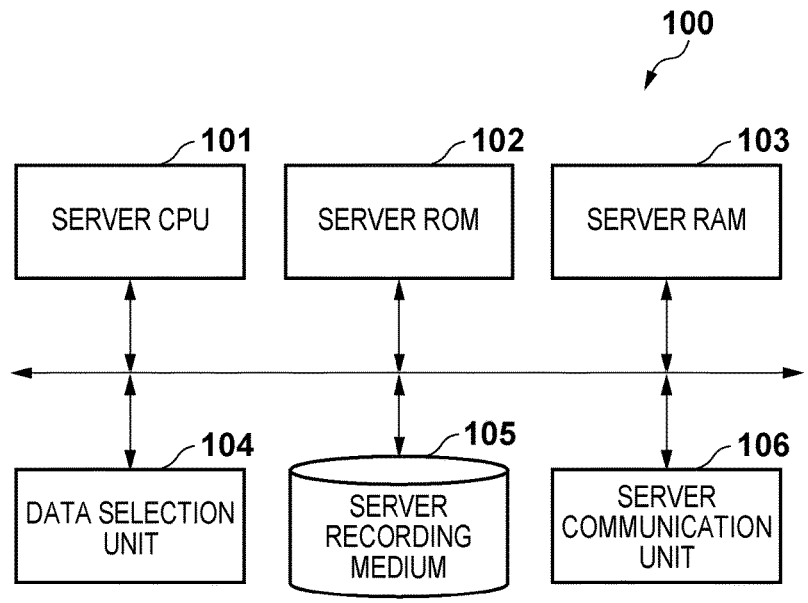
FIG. 2A is a block diagram showing a functional configuration of a content server 100 according to the embodiments of the present invention.

The following will describe the functional configuration of the content server 100 of the present embodiment in detail with reference to the block diagram of FIG. 2A.

A server CPU 101 controls the operations of the blocks of the content server 100. Specifically, the server CPU 101 controls the operation of each block by reading the operation program of the block that is stored in a server ROM 102, extracting the read operation program on a server RAM 103, and executing the operation program.

The server ROM 102 is, for example, a re-writable non-volatile memory. The server ROM 102 stores not only the operation programs of the blocks of the content server 100 but also parameters and the like that are needed for the operations of the blocks. Furthermore, in the server ROM 102, accounts, passwords, and the like of users of content services that are provided by the content server 100 are managed.

The server RAM 103 is a volatile memory. The server RAM 103 is used as not only an area in which the operation programs of the blocks of the content server 100 are extracted but also an area in which intermediate data and the like that were output during the operations of the blocks are stored.

A data selection unit 104 determines, upon being requested to provide content by the client terminal 200, data that is to be transmitted to the client terminal 200, and transmits the determined data via a below-described server communication unit 106. In the present embodiment, the game content data that is to be provided by the content server 100 is recorded in a server recording medium 105. The server recording medium 105 may be, for example, a storage device such as an HDD that is connected to the content server 100. It is assumed that each piece of game content data recorded in the server recording medium 105 is associated with classification information that is predetermined for the piece of data. The classification information may be information, such as model data, texture data, or collision determination data, with which usage or the like can be classified regardless of the types of data.

The server communication unit 106 is a communication interface of the content server 100 that communicates with an external device using a predetermined communication protocol. The server communication unit 106 is a so-called communication protocol stack, and includes a connection unit (a physical layer in the OSI reference model) that connects the content server 100 and an external communication line or an antenna, and a communication protocol such as PPP, HDLC, IPv4, IPX, TCP, or UDP (arbitrary communication protocol such as a link layer, a network layer, or a transport layer in the OSI reference model). It is also possible that the server communication unit 106 does not include the transport layer and the network layer according to circumstances.

Functional Configuration of Client Terminal 200

Figure 2B:
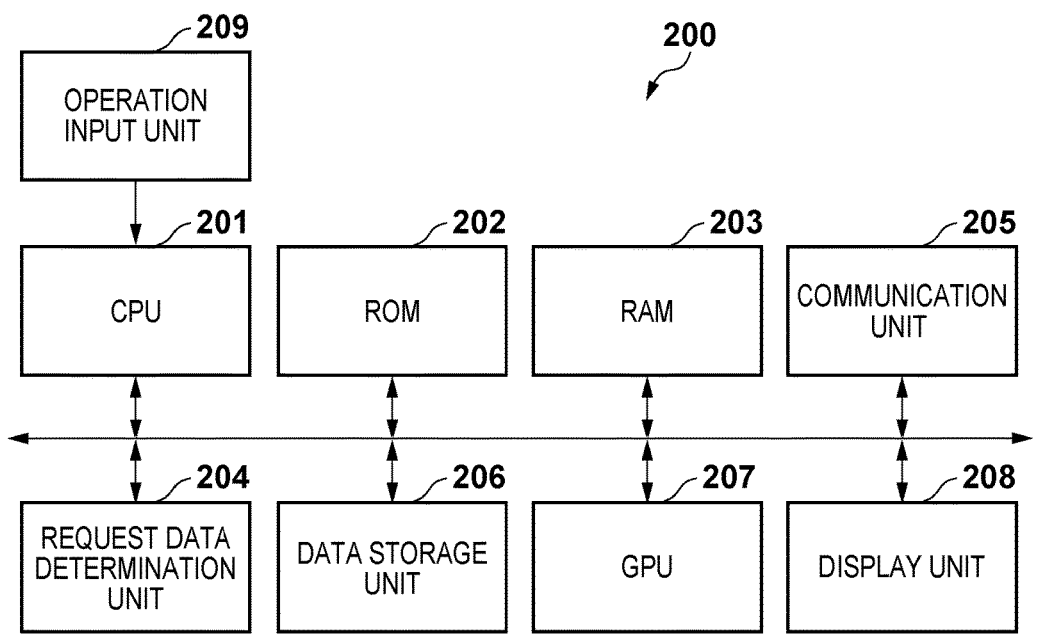
FIG. 2B is a block diagram showing a functional configuration of a client terminal 200 according to the embodiments of the present invention.

The following will describe the functional configuration of the client terminal 200 of the present embodiment in detail with reference to the block diagram of FIG. 2B.

A CPU 201 controls the operations of the blocks of the client terminal 200. Specifically, the CPU 201 controls the operation of each block by reading the operation program of the block that is stored in a ROM 202, extracting the read operation program on a RAM 203, and executing the operation program.

The ROM 202 is, for example, a re-writable non-volatile memory. The ROM 202 stores, in addition to the operation programs of the blocks of the client terminal 200, parameters and the like that are needed for the operations of the blocks.

Furthermore, in the present embodiment, the ROM 202 stores, with respect to content that is to be provided by the content server 100, at least information (necessary data information) for specifying data that is set by a user and needed when execution of rendering processing (playback processing) starts. Note that the necessary data information is assumed to include, for example, basic data that is minimally required for an object to be rendered on a screen of a game content, such as model data of a main character. However, data that is included in the necessary data information is not limited to this, and may also be selected so that a screen of the content is provided under the condition that is desired by the user.

The RAM 203 is a volatile memory. The RAM 203 is used as not only an area in which the operation programs of the blocks of the client terminal 200 are extracted but also an area in which intermediate data and the like that were output during the operations of the blocks are stored.

A request data determination unit 204 determines, with respect to a game content that is to be provided by the content server 100, data that is needed to render a screen of the content in the client terminal 200. Specifically, the request data determination unit 204 references the necessary data information depending on the state of receiving the content data, and gives a request for transmitting necessary data to the content server 100. Note that the transmission request generated by the request data determination unit 204 is transmitted to the content server 100 via a communication unit 205.

The communication unit 205 is a communication interface of the client terminal 200 that communicates with an external device using, for example, the same communication protocol as that of the server communication unit 106.

A GPU 207 generates a screen of a game content provided by the content server 100. Specifically, the GPU 207 uses, under the control of the CPU 201, content data received from the content server 100 to render a screen that is to be displayed on a below-described display unit 208 in a connected VRAM (not shown).

A data storage unit 206 is a storage device in which content data received from the content server 100 is stored. When the GPU 207 renders a screen, data stored in the data storage unit 206 is read, extracted on a GPU memory (not shown), then appropriately processed, and rendered in the VRAM.

A display unit 208 is a display device such as a LCD of the client terminal 200. The display unit 208 may also be an integrated display device that is provided on the client terminal 200, or an external display device that is connected to the client terminal 200.

An operation input unit 209 is a user interface of the client terminal 200, such as operation buttons, a keyboard, or a touch panel. When a user gives an operation input, the operation input unit 209 analyses the input, and transmits a control signal that corresponds to the content of the operation to the CPU 201.

Data Receiving Operation

First, data receiving operation in the content provision system of the present embodiment will be described.

In the content provision system according to the present embodiment, pieces of game content data are classified into two types of data, namely, data (first data) that is at least needed for starting providing content to a user of the client terminal 200, and data (second data) that is not needed to start providing the content, and the two types of data are received at different timings. Specifically, the client terminal 200 receives the first data and then starts receiving the second data. That is, in contrast to the conventional method in which processing for providing content to a user is executed after all pieces of content data have been received, in the content provision system of the present embodiment, the client terminal 200 can start executing the content providing processing after having intensively received the first data. Accordingly, a game content can be provided to a user without the user receiving all pieces of data, making it possible to reduce the user's waiting time for provision of the content.

In the content provision system of the present embodiment, it is determined whether game content data is the first data or the second data, based on the above-described necessary data information. In the present embodiment, the description is given assuming that when giving a request for transmitting game content data, the request data determination unit 204 references the necessary data information, and gives the request for transmitting game content data if there is the first data that has not yet been received, but the method for receiving two types of data separately is not limited to this.

For example, it is also possible that one data transmission request is given for one scene. In this case, it is sufficient that necessary data information is transmitted, together with the data transmission request, to the content server 100, and in the content server 100, the server CPU 101 references the received necessary data information and intensively transmits the first data to the client terminal 200.

Furthermore, for example, the necessary data information may also be stored in the content server 100 in association with an account of a user who uses the content. In this case, the user only needs to use the client terminal 200 to generate user-dedicated necessary data information in a setting phase, and store the generated necessary data information in the content server 100. Upon receiving a request for transmitting content data from the client terminal 200, the server CPU 101 only needs to reference the necessary data information that is associated with the account of the user who uses the client terminal 200 and has logged in the service, and first start transmitting the first data.

Note that in the present embodiment, the description is given assuming that the necessary data information is settable according to the user's preference, for example, such that an importance is placed on reduction in waiting time, on graphic quality, or the like, but is not limited to this. For example, the necessary data information may also have a configuration in which it is determined whether data is the first data or the second data based on the above-described types of classification information. Furthermore, the necessary data information may also have a configuration in which setting is changed by the server CPU 101 or the CPU 201 depending on, for example, the rate of data transfer between the content server 100 and the client terminal 200. In other words, since the waiting time is prolonged in the environment in which no sufficient data transfer rate can be ensured, the necessary data information may be changed so that the size of the first data is reduced automatically.

Data Classification Example

The following will describe examples of classification into the first data and the second data according to the game content. Note that it will readily be appreciated that the following description is to show examples, and the implementation of the present invention is not limited to these.

2D Graphic

In the case of, for example, a 2D graphics game such as a so-called beat-em-up game or an action game, graphic data on a main character that is used by a user of the game, and collision information or the like that is set for the character are transmitted as the first data on a priority basis. On the other hand, data that does not necessarily need to be displayed or used at the time of the start of providing content, such as graphic data for the back ground and GUI data of time display or the like, is transmitted as the second data after the transmission of the first data is completed.

3D Graphic

In the case of a 3D graphics game such as a game in which a character moves in a 3D scene, model data (or data on vertices and vertex connecting lines) on a main character in an event currently occurring, such as a character operated by a user or a character operated by a user in the cooperative play, geographic data in a rendering area and model data on a geographic object, collision information of a main character and a character in the vicinity of the main character, binary space partitioning (BSP) information, and the like are transmitted as the first data on a priority basis. On the other hand, model data and the like on a character other than the main character needs only to be transmitted as the second data.

Note that the classification in the 3D graphics game is not limited to this, and particularly when a range of the depth to be rendered is set, model data on a character or object that belongs to the range may also be set as the first data. When binary space partitioning (BSP) information is used, model data on a character or object that is rendered in the foreground according to the information may also be classified as the first data.

Furthermore, when color information is set for model data itself (respective pieces of vertex information), texture data that is applied to the model data may also be classified as the second data. Furthermore, texture data applied as a distant view of a field may also be classified as the first data.

Furthermore, GUI data or the like such as data that is two-dimensionally displayed in a 3D scene may also be classified as the second data, similarly to the 2D graphics game.

A Thinking Routine

In a so-called board game, information on a thinking routine or the like that is based on AI is preferably classified as the first data because the information needs to be data consistent throughout the game and is needed from beginning of the game. Note that, for example, a thinking routine that defines a pattern of behavior of an NPC character or the like in a 3D graphics game has a reduced need for being consistent throughout the game, and thus it is also possible that only part of the data is classified as the first data and the remaining part of the data is classified as the second data.

Moving Image Data

Moving image data that is to be played back in a game content has the large size of data, and thus is preferably classified as the second data. However, classification may be changed using coding units (GOP), for example, a given number of GOP from the top may be classified as the first data.

Sound Data

Classification of sound data that is to be played back in a game content may be changed according to the usage thereof. For example, the sound data that requires a response to a user operation, such as sound effects, may be classified as the first data, and the sound data that does not require the response, such as a BGM, may be classified as the second data.

In this way, classification of the game content data that is received by the client terminal 200 has been exemplified for each attribute of the data, but, in addition thereto, classification may also be defined as below while focusing on the data size.

For example, with respect to still image data such as moving image data or texture data, data whose coding rate or resolution is reduced, giving priority to reduction in the data size, may be provided as the first data, and data having an appropriate coding rate or resolution may be provided as the second data. At that time, the second data may be data that is replaced with the first data, or information on a difference from the first data, such as an extended layer of H.264/SVC.

It is conceivable that the same applies to sound data or model data. That is, sound data may also have a configuration in which data whose sampling rate or coding rate is reduced is classified as the first data, and then sound data having an appropriate sampling rate or coding rate is provided as the second data. Furthermore, model data may also have a configuration in which simple model data is provided as the first data, and then detailed model data is provided as the second data.

Data Acquisition Processing

The following will describe the specific procedure of data acquisition processing for acquiring data on a game content that is to be executed in the client terminal 200 of the present embodiment that has the above-described configuration with reference to the flowchart of FIG. 3. The procedure of the flowchart can be realized by the CPU 201 reading a corresponding process program stored in the ROM 202 for example, extracting the read process program on the RAM 203, and executing the process program. Note that the description will be given assuming that the present data acquisition processing starts when, for example, an event in which a scene is switched occurs in the game content, and the need for receiving new data from the content server 100 arises.

In step S301, the CPU 201 causes the request data determination unit 204 to determine data (request data) whose acquisition from the content server 100 is to be requested. Specifically, the CPU 201 transmits, to the request data determination unit 204, information that indicates data to be used for rendering the next scene, the data being specified in processing of the game in which execution of the game is controlled. The request data determination unit 204 references the information that indicates data to be used for rendering the next scene, and determines, from among the data, a piece of data that is not stored in the data storage unit 206 as request data.

In step S302, the request data determination unit 204 transmits, under the control of the CPU 201, a request for provision of the first data to the content server 100 via the communication unit 205. Specifically, the request data determination unit 204 references the necessary data information stored in the ROM 202, and generates a request for provision of the data that is classified as the first data, of the request data determined in step S301. Then, the request data determination unit 204 transmits the request for provision to the communication unit 205, and causes the communication unit 205 to send the request for provision.

In step S303, the CPU 201 determines whether or not the communication unit 205 has received the data from the content server 100. If the CPU 201 determines that the communication unit 205 has received the data, the CPU 201 advances the procedure to step S304, and if the CPU 201 determines that the communication unit 205 has not received the data, the CPU 201 advances the procedure to step S305.

In step S304, the CPU 201 stores the received data in the data storage unit 206. At that time, the CPU 201 updates management information stored in, for example, the RAM 203, the management information being information for managing data stored in the data storage unit 206.

In step S305, the CPU 201 determines whether or not the reception of the first data that is at least needed for processing for rendering the next scene is completed. Specifically, the CPU 201 determines whether or not the request data determination unit 204 has notified of the fact that all pieces of the first data were received. The request data determination unit 204 monitors the management information, and performs the notification when all pieces of the first data whose provision was requested are stored in the data storage unit 206. If the reception of the first data is completed, the CPU 201 starts executing the rendering processing in the game processing, and the CPU 201 advances the procedure to step S306. Whereas, if the reception of the first data is not completed, the CPU 201 returns the procedure to step S303.

In step S306, the request data determination unit 204 transmits, under the control of the CPU 201, a request for provision of the second data to the content server 100 via the communication unit 205.

In step S307, the CPU 201 determines whether or not the communication unit 205 has received the data from the content server 100. If the CPU 201 determines that the communication unit 205 has received the data, the CPU 201 advances the procedure to step S308, and if the CPU 201 determines that the communication unit 205 has not received data, the CPU 201 advances the procedure to step S309.

In step S308, the CPU 201 stores the received data in the data storage unit 206. At that time, the CPU 201 updates management information stored in, for example, the RAM 203, the management information being information for managing data stored in the data storage unit 206. Furthermore, since the received data is the second data at that time, in the rendering processing of the game processing that has already started, the CPU 201 executes the rendering processing using the data including that data. More specifically, the CPU 201 uses the first data and the received second data in the processing for rendering a frame that is to be rendered subsequently.

In step S309, the CPU 201 determines whether or not the reception of all pieces of data for use in rendering the next scene is completed. Specifically, the CPU 201 determines whether or not the request data determination unit 204 has notified of the fact that all pieces of the first and second data were received. The request data determination unit 204 monitors the management information, and performs the notification when all pieces of the second data whose provision was requested are stored in the data storage unit 206. If the CPU 201 determines that the reception of all pieces of data for use in rendering of the next scene is completed, the present data acquisition processing ends, and if the CPU 201 determines that the reception has not been completed, the CPU 201 returns the procedure to step S307.

With this, the CPU 201 can acquire preset data that is needed to start rendering the next scene on a priority basis, and thus it is possible to reduce the waiting time that is required until a game content is provided to the user. That is, as described above, the content provision system of the present embodiment can improve usability in providing content via communication.

Embodiment 2

In the above-described Embodiment 1, the description has been given such that game content data is transmitted only to the client terminal 200 from the content server 100, but the implementation of the present invention is not limited to this. In the present embodiment, the client terminal 200 can receive game content data also from another client terminal 200 other than the content server 100.

Configuration of Content Provision System

Figure 1B:
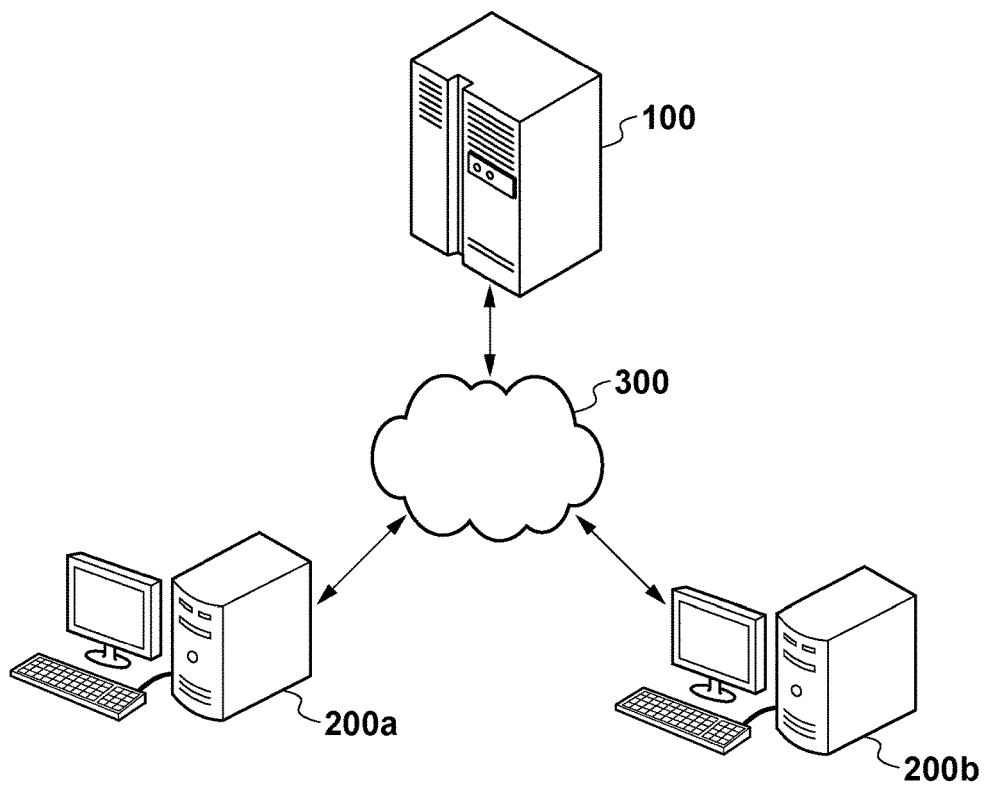
FIG. 1B is a diagram showing a system configuration of a content provision system according to Embodiment 2 of the present invention.

FIG. 1B shows a system configuration of a content provision system according to the present embodiment. In the figure, client terminals 200a and 200b are connected to the content server 100 via the network 300, and basically receive game content data from the content server 100. However, in the present embodiment, the client terminals 200a and 200b can perform one to one communication (for example, peer-to-peer (P2P) communication), and each client terminal can provide data that has already been received from the content server 100 to the other client terminal.

In the case where P2P communication is performed, communication between the client terminals does not need to be performed via a dedicated server. That is, data can directly be transmitted to the client terminal that is the communication partner, expecting a reduction in the communication amount (traffic). In the present embodiment, an aspect will be described in which the client terminal 200 can acquire data from another client via P2P communication, and thereby game content data is received in a shorter time and more efficiently.

Note that the functional configurations of the content server 100 and the client terminal 200 in the present embodiment are the same except that the communication unit 205 of the client terminal 200 has the P2P communication function, and thus descriptions thereof are omitted. Furthermore, in the present embodiment, the description is given assuming that communication between the client terminals is performed by P2P communication, but the communication method is not limited to this and may be near field wireless communication, communication in ad hoc mode, or the like.

Data Acquisition Processing

The following will describe the specific procedure of data acquisition processing for acquiring game content data that is executed in the client terminal 200 of the present embodiment with reference to the flowchart of FIG. 4. The procedure that corresponds to the flowchart is realized by the CPU 201 reading the corresponding process program stored in the ROM 202 for example, extracting the read process program on the RAM 203, and executing the process program. Note that the description is given assuming that the present data acquisition processing starts when, for example, an event in which a scene is switched occurs in the game content, and the need for receiving new data from the content server 100 arises.

Furthermore, in the data acquisition processing of the present embodiment, the same reference numerals are given to steps in which the same procedure is performed as that of the data acquisition processing of Embodiment 1 and descriptions thereof are omitted, and only characteristic procedure of the present embodiment will be described below.

In step S401, the CPU 201 reads management information stored in the RAM 203, transmits the read management information to the communication unit 205, and causes the communication unit 205 to send the management information to another client terminal that is currently connected to the content server 100. Information on the other client terminal that is currently connected to the content server 100 may be provided from the content server 100 when, for example, game processing is executed. The information includes information that is needed to connect to another client terminal, such as a global IP address of the other client terminal.

In step S402, the CPU 201 stands by the procedure for a predetermined time period that serves as a time period in which management information on data stored in a data storage unit 206 of the other client terminal currently connected to the content server 100 is received from the other client terminal. At that time, upon receiving the management information from the other client terminal, the CPU 201 stores the management information in the RAM 203 in association with information for specifying the client terminal that has received the management information. After the predetermined time period has elapsed, the CPU 201 advances the procedure to step S403.

In step S403, the CPU 201 causes the request data determination unit 204 to determine request data that is to be acquired from the content server 100 or another client terminal 200. Furthermore, after having determined the request data, the request data determination unit 204 determines which device is to be requested to transmit each piece of data. Specifically, the request data determination unit 204 references the management information on other client terminals 200 that is stored in the RAM 203, and determines the device from which data is to be acquired so that distributed data acquisition is possible.

In step S404, the request data determination unit 204 transmits, under the control of the CPU 201, a request for provision of the first data to the devices that were determined in step S403 and from which data is to be acquired via the communication unit 205, and the request data determination unit 204 advances the procedure to step S303.

Furthermore, in step S305, if it is determined that the reception of the first data is completed, the CPU 201 advances the procedure to step S405. In step S405, the request data determination unit 204 transmits, under the control of the CPU 201, a request for provision of the second data to the devices from which data is to be acquired via the communication unit 205, and the request data determination unit 204 advances the procedure to step S307.

With this, if there is another client terminal connected to the content server 100, the client terminal 200 of the present embodiment can acquire data also from the other client terminal, making it possible to totally reduce the time that is needed to acquire game content data.

Note that in the above-described data acquisition processing, the description has been given such that management information is shared with another client terminal only in steps S401 and S402, but the implementation of the present invention is not limited to this. For example, in the case where cooperative play of an online game for multiple users is performed, client terminals that are used by users who are taking part in the cooperative play perform the same game procedures. That is, if the game procedures are the same, it is considered that another client terminal executes the data acquisition processing at the same timing, and the other client terminal does not store data for use in rendering of the next scene in the stage in which data acquisition processing starts. In such a case, when updating the management information upon receiving data, the CPU 201 may also transmit the management information to another client terminal that is connected to the content server 100.

Furthermore, the content server 100 references the request for provision received from each client terminal, and if the same data is requested from a plurality of client terminals, the order of transmission of the data to the client terminals may be modified. That is, by intentionally modifying data that is stored in the client terminal connected to the content server 100, data acquisition via P2P communication is efficiently used and the total time period that is required for acquiring data for use in rendering of the next scene may be reduced. At that time, intentionally distributed data transmission may also be performed in units of files, or pieces of data divided from one file, such as coding units.

The present invention is not limited to the above-described embodiments, and various variation and modification are possible without departing from the spirit and scope of the present invention. Therefore, the following Claims are attached in order to make the scope of the present invention public.

What is claimed is:

1. A data provision system including a provision apparatus which provides data for game content and an execution apparatus which receives the data from the provision apparatus and generates a game screen for the game content by executing rendering processing for the game content, the data provision system comprising:
    the execution apparatus comprising:
        a central processor which is able to set data among the data for the game content as first data, which includes minimum required data on an execution start timing of the rendering processing for the game content;
        a first interface which is able to:
            transmit, to the provision apparatus, a first provision request of the first data, and a second provision request of second data among the data for the game content other than the first data; and
            receive the first data and the second data from the provision apparatus; and
        a graphics processor which is able to generate the game screen for the game content by using the first data and the second data received by the first interface; and
    the provision apparatus comprising:
        a second interface which is able to:
            receive, from the execution apparatus, the first provision request of the first data or the second provision request of the second data;
            transmit, to the execution apparatus, the first data in response to reception of the first provision request of the first data by the second interface; and
            transmit, to the execution apparatus, the second data in response to reception of the second provision request of the second data by the second interface,
    wherein the first interface transmits the first provision request of the first data and the second provision request of the second data based on setting of the data by the central processor, and
    the graphics processor starts generation of the game screen for the game content by using the first data after waiting completion of reception of the first data, and performs the generation of the game screen for the game content by using the first data and the second data after reception of the second data.

2. The data provision system according to claim 1, wherein the first interface transmits, to the provision apparatus, the first provision request of the first data or the second provision request of the second data by reference to information indicating whether each data for the game content is the first data or the second data.

3. The data provision system according to claim 1, wherein the execution apparatus notifies completion of the first data by the first interface in a case where the reception of the first data by the first interface is complete.

4. The data provision system according to claim 1, wherein each of the first data and the second data is constructed of a plurality of predetermined data units,
    the first interface receives in series the plurality of predetermined data units for each of the first data and the second data, and
    in a case where the plurality of predetermined data units for the second data is received by the first interface, the graphics processor generates the game screen for the game content by using the first data and the received plurality of predetermined data units for the second data.

5. The data provision system according to claim 1, wherein, in a case where another execution apparatus includes the first data or the second data:
    the first interface transmits the first provision request of the first data or the second provision request of the second data to the execution apparatus;
    the first interface receives the first data or the second data from the another execution apparatus; and
    the graphics processor generates the game screen for the game content by using the first data or the second data received from the provision apparatus and the another execution apparatus.

6. The data provision system according to claim 5, wherein each of the first data and the second data is constructed of a plurality of predetermined data units,
    the first interface is further able to receive, from each another execution apparatus including data for the game content, management information indicating the data for the game content that each another execution apparatus includes, respectively, and
    the first interface changes a destination of the first provision request of the plurality of predetermined data units for the first data and the second provision request of the plurality of predetermined data units for the second data, which the another execution apparatus includes, from the provision apparatus to the another execution apparatus based on the management information received by the first interface.

7. The data provision system according to claim 5, wherein each of the first data and the second data is constructed of a plurality of predetermined data units,
    the provision apparatus able to control, in a case where provision requests of data for same game content are received from a plurality of execution apparatuses by the second interface, destinations of data transmitted by the second interface, and the provision apparatus controls a transmission order of the plurality of predetermined data units transmitted from the second interface to each of the plurality of execution apparatuses such that the plurality of predetermined data units for each of the first data and the second data are distributed to the plurality of the execution apparatuses to which the plurality of data units is to be transmitted.

8. A provision apparatus providing data for game content to an execution apparatus which generates a game screen for the game content by executing rendering processing for the game content, the provision apparatus comprising:

a processor; and a memory including instructions that, when executed by the processor, cause the processor to perform operations including:

receiving, via an interface and from the execution apparatus, a first provision request of first data, which at least includes minimum required data on an execution start timing of the rendering processing for the game content, among the data for the game content, and a second provision request of second data among the data for the game content other than the first data;

transmitting, via the interface and to the execution apparatus, the first data in response to reception of the first provision request of the first data by the interface; and transmitting, via the interface and to the execution apparatus, the second data in response to reception of the second provision request of the second data by the interface, wherein the execution apparatus sets data among the data for the game content as the first data, the interface receives the first provision request of the first data and the second provision request of the second data based on setting of the data by the execution apparatus, and the interface receives the second provision request of the second data from the execution apparatus after completing the transmitting of the first data.

9. An execution apparatus for receiving data, from a provision apparatus which provides the data for game content, and for generating a game screen for the game content by executing rendering processing for the game content, the execution apparatus comprising:

a central processor which is able to set data among the data for the game content as first data, which includes minimum required data on an execution start timing of the rendering processing for the game content;

an interface which is able to:

transmit, to the provision apparatus, a first provision request of the first data, and a second provision request of second data among the data for the game content other than the first data; and receive the first data and the second data from the provision apparatus; and a graphics processor which is able to generate the game screen for the game content by using the first data and the second data received by the interface, wherein the interface transmits the first provision request of the first data and the second provision request of the second data based on setting of the data by the central processor, and the graphics processor starts generation of the game screen for the game content by using the first data after waiting completion of reception of the first data, and performs the generation of the game screen for the game content by using the first data and the second data after reception of the second data.

10. A control method of a data provision system including a provision apparatus which provides data for game content and an execution apparatus which receives the data from the provision apparatus and generates a game screen for the game content by executing rendering processing for the game content, the control method comprising:

the execution apparatus setting data among the data for the game content as first data, which includes minimum required data on an execution start timing of the rendering processing for the game content;

the execution apparatus transmitting, to the provision apparatus, a first provision request of the first data, and a second provision request of second data among the data for the game content other than the first data;

the provision apparatus receiving, from the execution apparatus, the first provision request of the first data or the second provision request of the second data;

the provision apparatus transmitting, to the execution apparatus, the first data in response to reception of the first provision request of the first data;

the provision apparatus transmitting, to the execution apparatus, the second data in response to reception of the second provision request of the second data, the execution apparatus generating the game screen for the game content by using the first data and the second data, wherein the execution apparatus transmits the first provision request of the first data and the second provision request of the second data based on the setting of the data;

the execution apparatus transmits the second provision request of the second data after completing reception of the first data, and the execution apparatus starts generation of the game screen for the game content by using the received first data after waiting completion of the reception of the first data, and performs the generation of the game screen for the game content by using the first data and the second data after reception of the second data.

11. A control method of a provision apparatus providing data for game content to an execution apparatus which generates a game screen for the game content by executing rendering processing for the game content, the control method comprising:

receiving, via an interface and from the execution apparatus, a first provision request of first data, which at least includes minimum required data on an execution start timing of the rendering processing for the game content, among the data for the game content, and a second provision request of second data among the data for the game content other than the first data;

transmitting, via the interface and to the execution apparatus, the first data in response to reception of the provision request of the first data; and transmitting, via the interface and to the execution apparatus, the second data in response to reception of the provision request of the second data, wherein the execution apparatus sets data among the data for the game content as the first data, the interface receives the first provision request of the first data and the second provision request of the second data based on setting of the data by the execution apparatus, and the second provision request of the second data is received from the execution apparatus after completing the transmitting of the first data.

12. A control method of an execution apparatus for receiving data, from a provision apparatus which provides the data for game content, and for generating a game screen for the game content by executing rendering processing for the game content, the control method comprising:

setting, by a central processor, data among the data for the game content as first data, which includes minimum required data on an execution start timing of the rendering processing for the game content;

transmitting, via an interface and to the provision apparatus, a first provision request of the first data, and a second provision request of second data among the data for the game content other than the first data;

receiving, via the interface and from the provision apparatus, the first data and the second data; and generating, via a graphics processor, the game screen for the game content by using the first data and the second data received in the receiving, wherein the first provision request of the first data and the second provision request of the second data are transmitted based on the setting of the data, and after waiting completion of reception of the first data, generation of a game screen for the game content is started by using the first data, and after reception of the second data, the generation of the game screen for the game content is performed by using the first data and the second data.

* * * * *